United States Patent [19]
Shimada et al.

[11] Patent Number: 5,256,907
[45] Date of Patent: Oct. 26, 1993

[54] ELECTRIC POWER SUPPLY APPARATUS

[75] Inventors: Ryuichi Shimada; Tatsuya Matsukawa, both of Ibaraki; Yasuo Yoshida, Hyogo, all of Japan

[73] Assignees: Mitsubishi Denki Kabushiki Kaisha, Hyogo; Japan Atomic Energy Research Institute, Ibaraki, both of Japan

[21] Appl. No.: 892,498

[22] Filed: Jun. 3, 1992

Related U.S. Application Data

[63] Continuation of Ser. No. 363,730, Jun. 9, 1989.

[30] Foreign Application Priority Data

Jun. 13, 1988 [JP] Japan .............................. 63-145232
Jun. 5, 1989 [JP] Japan .................... 1-142456

[51] Int. Cl.$^5$ .............................................. H02K 7/02
[52] U.S. Cl. ............................. 307/82; 318/161
[58] Field of Search ........................... 307/18-29, 307/44-47, 64, 68, 82-89; 363/67-70, 123, 125, 128, 129; 318/140, 148, 150, 161; 322/4; 323/355

[56] References Cited

U.S. PATENT DOCUMENTS

| | | | |
|---|---|---|---|
| 4,019,115 | 4/1977 | Lips | 307/82 X |
| 4,321,478 | 3/1982 | Plunkett et al. | 307/47 |
| 4,358,719 | 11/1982 | Currier et al. | 318/161 |
| 4,366,532 | 12/1982 | Rosa et al. | 363/69 |
| 4,454,930 | 6/1984 | Nomura et al. | 187/29 R |
| 4,612,494 | 9/1986 | Kawamura | 322/4 |
| 4,649,287 | 3/1987 | Nola | 307/31 |
| 4,667,364 | 6/1987 | Williams et al. | 322/47 |
| 4,847,744 | 7/1989 | Araki | 363/49 |

OTHER PUBLICATIONS

Markus, John. *Sourcebook of Electronic Circuits* 1968, pp. 138, 313, 496.

*Primary Examiner*—A. D. Pellinen
*Assistant Examiner*—Aditya Krishnan
*Attorney, Agent, or Firm*—Leydig, Voit & Mayer

[57] ABSTRACT

An electric power supply apparatus used to supply electric power to a varying load by using a flywheel generator. A first electric power converter has an input terminal end connected to the flywheel generator. An electric power converter circuit is composed of a second electric power converter having input terminal end connected to a utility line and a low inductance coil connected in series with the second electric power converter. The first electric power converter and the electric power converter circuit are connected in parallel to the load so as to constitute a thyristor driving device in respect to the flywheel generator.

16 Claims, 2 Drawing Sheets

ELECTRIC POWER SUPPLY APPARATUS

This application is a continuation of application Ser. No. 07/363,730, filed Jun. 9, 1989.

BACKGROUND OF THE INVENTION

1. Field of the Invention

This invention relates to an electric power supply apparatus using a flywheel generator for supplying electric power, for example, a nuclear fusion test device, an iron and steel manufacturing system or an electrical power source for a train or the like.

2. Description of the Prior Art

FIG. 1 shows conventional type of electrical power supply apparatus having, as its load, a toroidal magnetic field coil of a nuclear fusion test device as described in IEEE Transactions Energy Conversion. In this figure, 1 designates a toroidal magnetic filed coil; 2 designates an electric power converter having an input end connected to an utility line; 3 designates flywheel generator; 4 designates an electric power converter having an input end connected to the flywheel generator 3, the electric power converter 4 being connected in series with the power converter 2 and used as a converter; 5A and 5B designate a transformer connected to a system bus line; 6 designates an electric power converter having an input end connected to the transformer 5B and used as a converter; 7 designates a DC reactor having one end connected to the power converter 6; 8 designates a power converter used as an inverter for converting DC power supplied from the DC reactor 7 into an AC power; 9 designates an AC reactor mounted between the flywheel generator 3 and the power converter 8; 10 designates a transformer arranged between the flywheel generator 3 and the power converter 4; and 14, 14A and 14B designate a breaker, respectively.

A thyristor driving device is composed of the above-mentioned power converters 6 and 8, the DC reactor 7 and the AC reactor 9.

Operation of this conventional system will now be described.

If electric power is to be supplied to the toroidal magnetic field coil 1, which acts as a load, AC electric power is converted into DC electric power through both the power converter 2, which is connected to the utility line, and the power converter 4, which is connected to the flywheel generator 3. This DC electric power is then supplied to the toroidal magnetic field coil 1.

Alternatively, if electric power is used to accelerate the flywheel generator 3, AC electric power from the utility line is supplied to the electric power converter 6 through the transformer 5B and converter into DC electric power there. This DC electric power is then supplied to the electric power converter 8 through DC reactor 7. This electric power converter 8 is used as an inverter wherein the DC electric power is converted into AC electric power again. This AC electric power is then supplied to the flywheel generator 3 through the AC reactor 9.

As a result, the flywheel generator 3 is accelerated by the supplied electric power so as to accumulate mechanical energy, which may later be supplied to the toroidal magnetic field coil 1 as electrical energy.

In the foregoing description, the toroidal magnetic field coil 1 is connected in series between the power converter 2, which receives electric power from the utility line, and the power converter 4, which receives electric power from the flywheel generator 3. The system; may also be arranged so that the utility line is eliminated and only the power supplied from the flywheel generator 3 is applied to the load.

In the foregoing description, the toroidal magnetic field coil 1 of a nuclear fusion test equipment is used as the load. This is only one example, however. Other examples of the load include an electric motor, such as one used in an iron and steel manufacturing plant, and an electric train, such as one in an electric railway system and the like. Furthermore, as described above, the system is constituted such that energy is temporarily stored in the flywheel generator 3 and this stored energy is supplied to the load as required. A different type of system may alternatively be used with the invention.

A disadvantage associated with the conventional type of the electric power supply apparatus described above is that it requires several electric power converters; the power converters 2 and 4 for supplying electric power to the load and the electric power converters 6 and 8 for supplying electric power to the flywheel generator 3.

SUMMARY OF THE INVENTION

It is an object of the present invention to provide an electric power supply apparatus in which the required number of electric power converters is decreased the configuration of the system is simplified, and the apparatus can be made less expensive.

It is another object of the present invention to provide an economical electric power supply apparatus in which energy accumulated in the flywheel generator can be continuously regenerated and supplied to the utility line efficiently.

Accordingly, the present invention provides an electric power supply apparatus which includes a first power converter and a power conversion circuit. The first power converter has a terminal connected to a flywheel generator. The power conversion circuit includes a second power converter having a terminal connected to a utility line. The first power converter and the power conversion circuit are connected in parallel with a varying load. A switching arrangement is provided to disconnect the varying load from either the first or second power converters. A third power converter is connected in series between the load and the connection between the first power converter and the power conversion circuit. The third power converter has a terminal connected to a utility line.

In embodiments of the invention, the first electric power converter can supply electric power from the flywheel generator to the load or, in cooperation with the second electric power converter, can supply electric power to drive the flywheel generator.

The above and further objects and novel features of the invention will be more fully understood in light of the following detailed description and the accompanying drawings. Drawings are used for the purpose of illustration only and are not intended to limit the invention.

DETAILED DESCRIPTION OF THE PREFERRED EMBODIMENTS

Referring now to the accompanying drawings, the preferred embodiments of the present invention will be described in detail.

Figure 1:
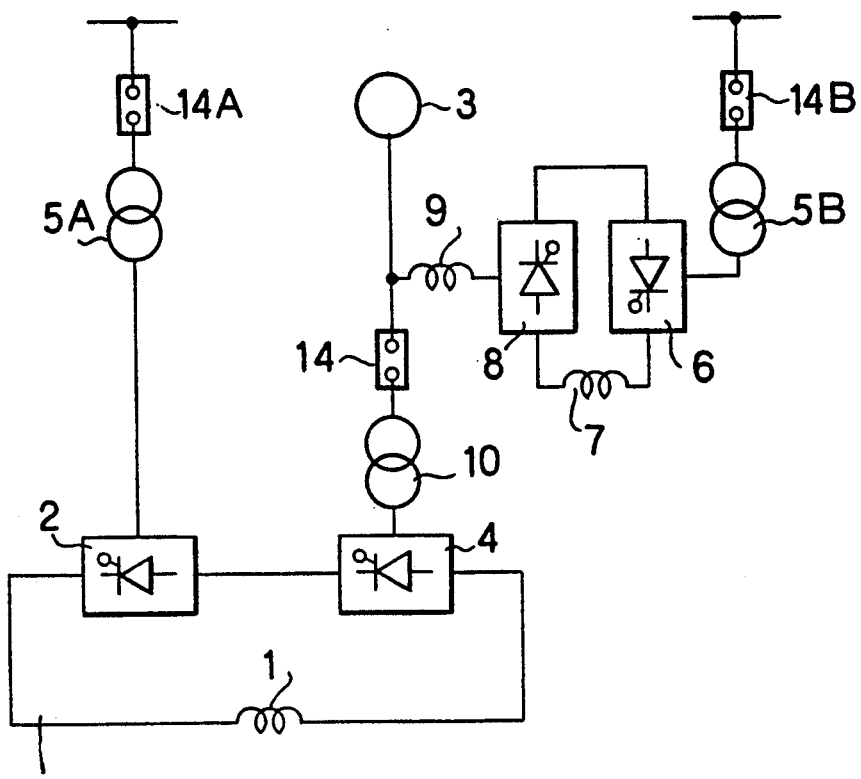
FIG. 1 is a view of configuration for showing a conventional type of electric power supply apparatus.
Figure 2:
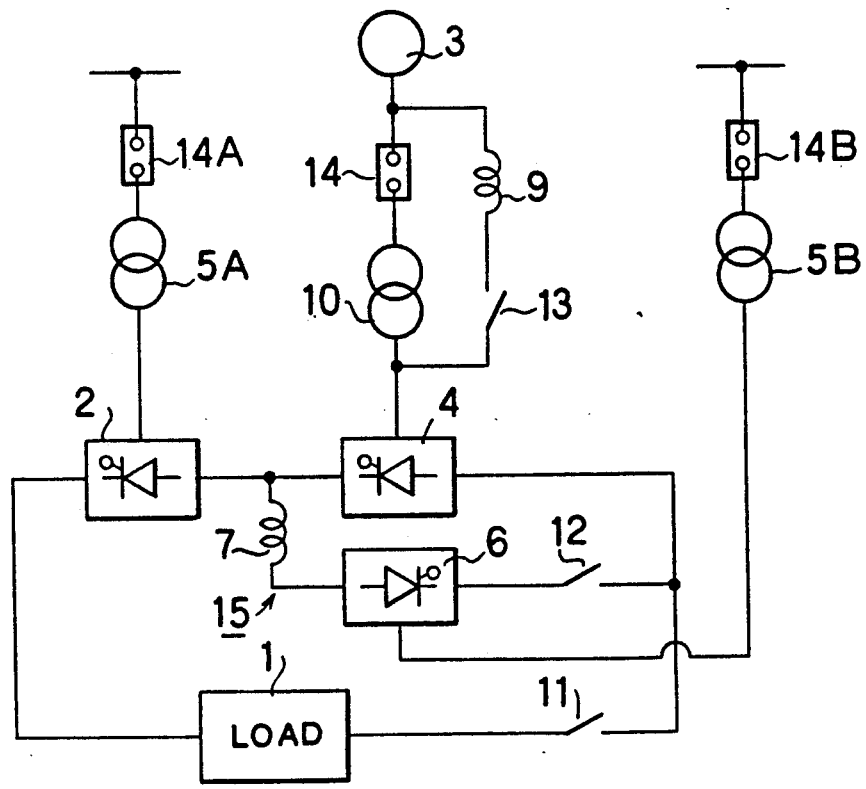
FIG. 2 is a view of configuration for showing an electric power supply apparatus of a first preferred embodiment of the present invention.

FIG. 2 illustrates a first preferred embodiment of the present invention, in which the portions substantially corresponding to those of FIG. 1 are designated with the same reference numerals, In FIG. 2, 15 designates an electric power converter circuit which is composed of an electric power converter 6 and a DC reactor 7. This electric power converter circuit is connected in parallel with the electric power converter 4. The electric power converter 4 is also used as the electric power converter 8 shown in FIG. 1. Due to this fact, the AC reactor 9 shown in FIG. 1 is connected in parallel with a transformer 10 which is used to supply electric power to the electric power converter 4.

Reference numeral 1 designates a load; 11 designates a switch connected in series with the load 1, 12 designates a switch connected in series with the electric power converter 6, and 13 designates a switch connected in series with the AC reactor 9.

The electric power converter 4 is a first electric power converter, the electric power converter 6 is a second electric power converter and the DC reactor 7 is a low inductance coil. A thyristor driving apparatus is constituted by the electric power converters 4 and 6, the DC reactor 7 and the AC reactor 9.

Operation of the system will be described as follows. To supply electric power to the load 1, the switch 11 is turned on and both switches 12 and 13 are turned off. The operation of the system can then be carried out in quite the same manner as that of the conventional system.

To accelerate the flywheel generator 3, the switch 11 is turned off and both switches 12 and 13 are turned on. Simultaneously with this operation, the breaker 14 is turned off.

Accordingly, after the electric power supplied from the utility line through the transformer 5B is converted into DC electric power by the electric power converter 6, the DC electric power is supplied to the electric power converter 4 through DC reactor 7. In this case, the electric power converter 4 is used as an inverter to convert the DC electric power from the DC reactor 7 into AC electric power. This converted AC electric power is supplied to the flywheel generator 3 through the switch 13 and AC reactor 9.

In the above-mentioned preferred embodiment, a system for supplying electric power to the load 1 and the flywheel generator 3 has been described. By applying the same configuration as above, it is also possible to regenerate and supply rotational energy of the flywheel generator 3 to the utility line and to supply energy such as the electro-magnetic energy of a toroidal magnetic field coil provided by the load 1, for example, to the flywheel generator 3.

That is, if the rotational energy provided by the flywheel generator 3 is to be regenerated, the switch 11 and the breaker 14 are turned off and the switches 12 and 13 are turned on to use the electric power converter 4 as a converter and at the same time the electric power converter 6 as an inverter. This operation is opposite to the operation providing driving acceleration to the flywheel generator 3.

If the energy provided by the load 1 is to be supplied to the flywheel generator 3 as rotational energy, it is assumed that the switch 11 is turned on and the switch 13 is turned on and at the same time the switch 12 and the breaker 14 are turned off. The electric power converter 4 may then be operated as an inverter.

Further, if all the energies are to be supplied to the utility line, the energy of the load 1 is first supplied to the flywheel generator 3 and the rotational energy of the flywheel generator 3 is then regenerated and supplied to the utility line. Thus all the energies of the system can be regenerated and supplied to various locations.

Figure 3:
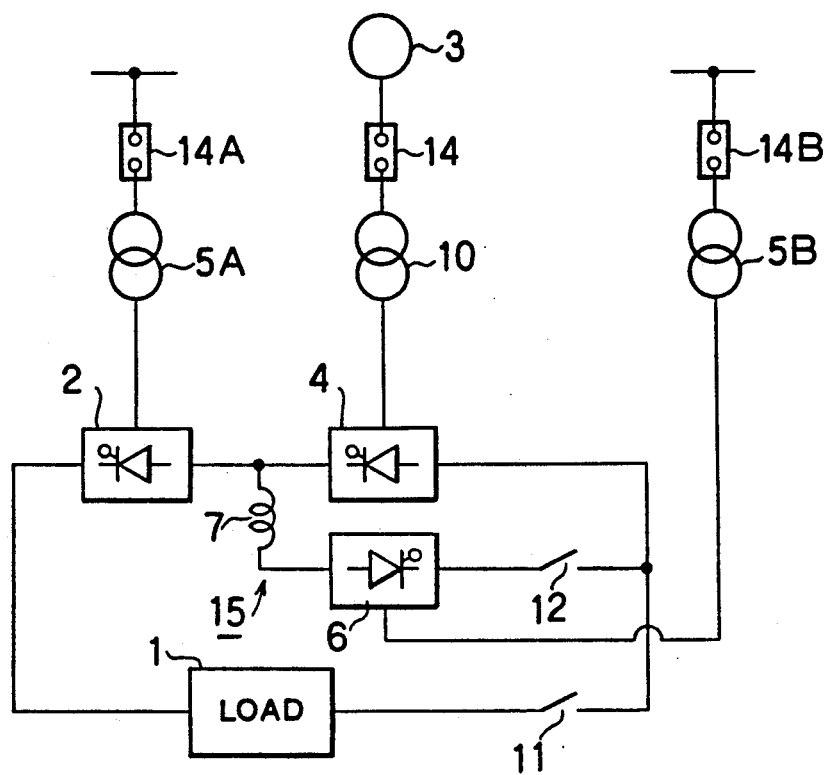
FIG. 3 is a view of configuration for showing an electric power supply apparatus of a second preferred embodiment of the present invention.

FIG. 3 illustrates a second preferred embodiment of the present invention in which reactance of the transformer 10 acts as a low inductance coil and substitutes for the AC reactor 9 as a low inductance coil shown in FIG. 1 to simplify the configuration of the system.

Figure 4:
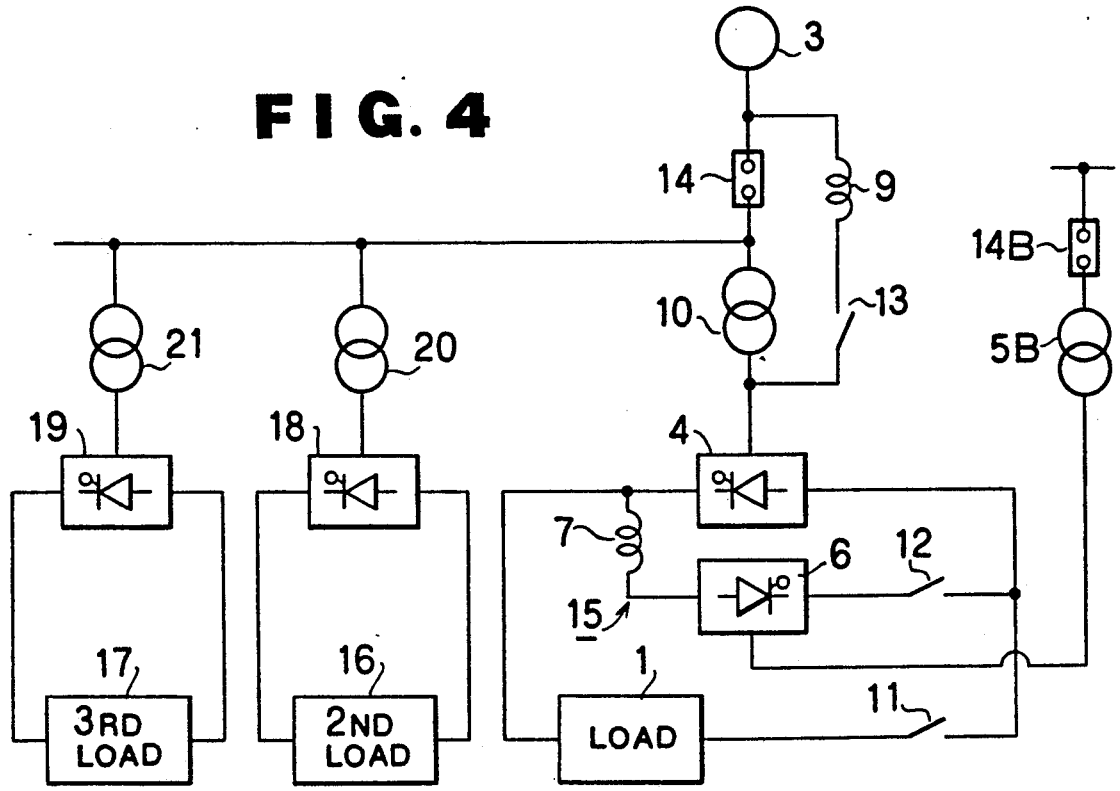
FIG. 4 is a view of configuration for showing an electric power supply apparatus of a third preferred embodiment of the present invention.

In the above-described first and second preferred embodiments, the system includes the load 1 and the flywheel generator 3. However, it may also be possible to provide plural loads for one flywheel generator 3. FIG. 4 illustrates a third preferred embodiment of the present invention applied in this case.

In FIG. 4, reference numerals 16 and 17 designate a second and a third load, 18 and 19 designate an electric power converter used to supply electric power to the loads 16 and 17, and 20 and 21 designate a transformer used to supply AC electric power of the flywheel generator 3 to the power converters 18 and 19, respectively. A line branches from the line connecting the flywheel generator 3 and the first electric power converter 4. The line is connected through transformers 20, 21 to several electric power converters 18, 19, each of which in turn is connected in series to a load 16, 17.

In this preferred embodiment, the electric power converter constituting the thyristor driving device may have in common a part of the electric power converter for supplying electric power to a certain load.

As described above, according to the present invention, the electric power conversion circuit composed of the second electric converter 6 and a low inductance coil 7 is connected in parallel with the first electric power converter 4 so as to constitute the thyristor driving device for the flywheel generator. The required number of electric power converters can then be reduced or decreased, simplifying and decreasing the cost of the apparatus. In addition, after the energy provided by the load is returned to the flywheel generator, the rotational energy provided by the flywheel generator can be regenerated and supplied continuously to the utility line, allowing the system to operate very economically.

What is claimed is:

1. An electric power supply apparatus having a flywheel generator capable of regenerating energy to supplement electric power from a utility line and supply electric power to a varying load, the apparatus comprising:

a first power converter having a terminal connected to the flywheel generator;

a power conversion circuit including a second power converter having a terminal connected to the utility line wherein the first power converter and the power conversion circuit are connected in parallel with the varying load;

a switching arrangement coupled to disconnect the load from at least one of the first and second power converters; and a third power converter connected in series with the load between the load and the connection of the first power converter and the power conversion circuit, the third power converter having a terminal connected to the utility line.

2. An electric power supply apparatus according to claim 1 wherein the first power converter is bidirectional.

3. An electric power supply apparatus according to claim 1 wherein the switching arrangement comprises a first switch connected between the load and the parallel connection of the first power converter and the power conversion circuit and a second switch connected in series with the power conversion circuit.

4. An electric power supply apparatus according to claim 1 wherein the third power converter is bidirectional.

5. An electric power supply apparatus for transferring energy between a utility line, a flywheel generator, and a load, the electric power supply apparatus comprising:

a first power converter having an input terminal connected to the flywheel generator;

a power conversion circuit including a second power converter having a terminal connected to the utility line, the first power converter and the power conversion circuit being connected in parallel with the load;

switch means for interconnecting the utility line and the flywheel generator and interconnecting the flywheel generator and the load through at least one of the first power converter and the power conversion circuit;

a transformer connected between the terminal of the first power converter and the flywheel generator; and a switch and an AC reactor connected in series across the transformer.

6. An electric power supply apparatus according to claim 5 wherein the switch means includes a first switch connected between the load and the parallel connection of the first power converter and the power conversion circuit and a second switch connected in series with the power conversion circuit.

7. An electric power supply apparatus according to claim 5 wherein the first power converter is bidirectional.

8. An electric power supply apparatus for transferring energy between a utility line, a flywheel generator, and a load, the electric power supply apparatus comprising:

a first power converter having a terminal connected to the flywheel generator;

a first transformer and an AC reactor coupled between the terminal of the first power converter and the flywheel generator;

a power conversion circuit including a second power converter having a terminal connected to the utility line, an inductance coil connected in series with the second power converter, and a first switch connected in series with the second power converter, the first power converter and the power conversion circuit being connected in parallel with load;

a second transformer coupled between the input terminal of the second power converter and the utility line; and a second switch connected between the load and the parallel connection of the first power converter and the power conversion circuit.

9. An electric power supply apparatus according to claim 8 wherein the first and second power converters are bidirectional.

10. An electric power supply apparatus according to claim 8 wherein the first transformer has a reactance and the AC reactor includes the reactance of the first transformer.

11. An electric power supply apparatus according to claim 8 further comprising a third switch connected in series with the AC reactor, the AC reactor and the third switch being connected in parallel across the first transformer coupled between the terminal of the first power converter and the flywheel generator.

12. An electric power supply apparatus having a flywheel generator capable of regenerating energy to supplement electric power from a utility line and supply electric power to a varying load, the apparatus comprising:

a first power converter having a terminal connected to the flywheel generator;

a power conversion circuit including a second power converter having an input terminal connected to the utility line wherein the first power converter and the power conversion circuit are connected in parallel with the varying load;

a switching arrangement coupled to disconnect the load from at least one of the first and second power converter; and a connecting line connected between the flywheel generator and the first power converter and plural load circuits including a load connected in series with a third power converter, the plural load circuits being directly connected to the connecting line.

13. An electric power supply apparatus according to claim 12 wherein the first, second, and third power converters are bidirectional.

14. An electric power supply apparatus having a flywheel generator capable of generating energy to supplement electric power from a utility line and supply electric power to a varying load, the apparatus comprising:

a first power converter having a terminal connected to the flywheel generator;

a power conversion circuit including a second power converter having a terminal connected to the utility line wherein the first power converter and the power conversion circuit are connected in parallel with the varying loads;

a switching arrangement coupled to disconnect the load from at least one of the first and second power converters; and a third power converter connected in series with the load between the load and the connection of the first power converter and the power conversion circuit, the third power converter having a terminal directly connected to the utility line wherein the first, second, and third power converters are bidirectional.

15. An electric power supply apparatus having a flywheel generator capable of regenerating energy so as to supplement electric power from a utility line and supply electric power to a varying load, the apparatus comprising:

a first power converter having a terminal connected to the flywheel generator;

a power conversion circuit including a second power converter having a terminal connected to the utility line wherein the first power converter and the power conversion circuit are connected in parallel with the varying load;

a switching arrangement coupled to disconnect the load from at least one of the first and second power converters;

a connecting line connected between the flywheel generator and the first power converter and plural load circuits including a load connected in series with a third power converter, the plural load circuits being connected to the connecting line.

16. An electric power supply apparatus according to claim 15 wherein the third power converter is bidirectional.

* * * * *